United States Patent [19]
Walch et al.

[11] Patent Number: 5,992,133
[45] Date of Patent: Nov. 30, 1999

[54] AGRICULTURAL MACHINE FOR HARVESTING PLANT MATTER, WITH TWO CONDITIONING UNITS

[75] Inventors: Martin Walch, Dettwiller; Bernard Wattron, Haegen, both of France

[73] Assignee: Kuhn S.A., Saverne Cedex, France

[21] Appl. No.: 08/896,009

[22] Filed: Jul. 17, 1997

[30] Foreign Application Priority Data

Jul. 22, 1996 [FR] France ................................ 96 09351

[51] Int. Cl.⁶ .................................................. A01D 82/00
[52] U.S. Cl. ............................... 56/6; 56/16.4 B; 56/192
[58] Field of Search ...................... 56/6, 16.4 R, 16.4 A, 56/16.4 B, 16.4 C, 192

[56] References Cited

U.S. PATENT DOCUMENTS

| | | |
|---|---|---|
| 4,142,349 | 3/1979 | Hellkuhl et al. . |
| 4,519,188 | 5/1985 | Webster et al. . |
| 4,610,128 | 9/1986 | Ermacora . |
| 4,669,256 | 6/1987 | Ermacora et al. . |
| 4,694,640 | 9/1987 | Ermacora et al. . |
| 4,714,123 | 12/1987 | Ermacora et al. . |
| 4,719,742 | 1/1988 | Ermacora et al. . |
| 4,720,964 | 1/1988 | Ermacora et al. . |
| 4,723,396 | 2/1988 | Ermacora . |
| 4,763,463 | 8/1988 | Ermacora et al. . |
| 4,771,591 | 9/1988 | Ermacora . |
| 4,811,553 | 3/1989 | Ermacora et al. . |
| 4,833,868 | 5/1989 | Ermacora et al. . |
| 4,848,069 | 7/1989 | Ermacora et al. . |
| 4,947,629 | 8/1990 | Ermacora et al. . |
| 4,986,064 | 1/1991 | Ermacora . |
| 4,991,383 | 2/1991 | Ermacora . |
| 5,060,462 | 10/1991 | Helfer et al. . |
| 5,094,063 | 3/1992 | Wattron et al. . |
| 5,107,663 | 4/1992 | Wattron et al. . |
| 5,136,828 | 8/1992 | Ermacora . |
| 5,199,249 | 4/1993 | Wattron et al. . |
| 5,199,250 | 4/1993 | Ermacora et al. . |
| 5,357,737 | 10/1994 | Ermacora et al. . |
| 5,417,042 | 5/1995 | Walch et al. . |
| 5,423,165 | 6/1995 | Walch et al. . |
| 5,507,136 | 4/1996 | Walch . |
| 5,522,208 | 6/1996 | Wattron . |

FOREIGN PATENT DOCUMENTS

| | | |
|---|---|---|
| 0 163 587 | 12/1985 | European Pat. Off. . |
| 0 277 343 | 8/1988 | European Pat. Off. . |
| 0 357 312 | 3/1990 | European Pat. Off. . |
| 0 429 383 | 5/1991 | European Pat. Off. . |
| 0 593 377 | 4/1994 | European Pat. Off. . |
| 0 678 237 | 10/1995 | European Pat. Off. . |
| 2 376 615 | 8/1978 | France . |

*Primary Examiner*—Terry Lee Melius
*Attorney, Agent, or Firm*—Oblon, Spivak, McClelland, Maier & Neustadt, P.C.

[57] ABSTRACT

The present invention relates to an agricultural machine for harvesting plant matter including: a mobile frame; a draw bar connected to the mobile frame; a harvesting mechanism having two conditioning units, each one provided with two contra-rotating conditioning members; and transmission members intended to impart movement to the conditioning units and including a transmission box equipped with a first output shaft and with a second output shaft. The inner end of each first conditioning member is supported by the corresponding first output shaft, and a transmission device of each second conditioning member couples an end thereof to the corresponding second output shaft.

40 Claims, 8 Drawing Sheets

AGRICULTURAL MACHINE FOR HARVESTING PLANT MATTER, WITH TWO CONDITIONING UNITS

BACKGROUND OF THE INVENTION

1. Field of the Invention

The present invention relates to an agricultural machine for harvesting plant matter including:

a mobile frame, a draw bar intended to connect said agricultural machine for harvesting plant matter to a towing vehicle and itself connected to the frame by means of an articulation in such a way that it can pivot about an upward-directed axis of pivoting, a harvesting mechanism connected to the mobile frame and including:
  a cutting mechanism comprising cutting members intended to cut the plant matter, and
  a conditioning device comprising two conditioning units extending substantially in the extension of one another and each equipped with two contra-rotating conditioning members which can move apart and between which the plant matter cut by the cutting members is intended to pass in order to be treated, transmission members intended, among other things, to impart movement to the conditioning units and comprising a transmission box extending between the two conditioning units and including for each of these:
  a first output shaft connected, by means of a coupling, to the inner end of the first conditioning member close to the transmission box, and
  a second output shaft coupled, by means of a transmission device, to the second conditioning member.

2. Discussion of the Background

Such an agricultural machine for harvesting plant matter is known from American patents U.S. Pat. No. 4,142,349 and U.S. Pat. No. 3,772,865.

This known agricultural machine for harvesting plant matter includes a harvesting mechanism comprising a carrying structure to which is attached a cutting mechanism and a conditioning device.

The cutting mechanism includes two pairs of cutting members suspended from the carrying structure and placed one beside the other. The cutting members are driven in rotation by means of transmission members in such a way that the direction of rotation of two cutting members forming a pair converge, so as to form a windrow of cut plant matter.

The conditioning device includes two conditioning units each extending behind a pair of cutting members and substantially in the extension of one another. Each conditioning unit is equipped with two contra-rotating conditioning members which can move apart and between which the plant matter cut by the corresponding two cutting members is intended to pass in order to be treated. For this, two pairs of arms, each extending backward and downward and fixed to the carrying structure are provided.

Each conditioning member is connected at each of its ends to a corresponding arm by means of a cylindrical connection.

The conditioning units are also driven by means of the transmission members. For this, a transmission box is provided and this extends behind the cutting mechanism between the two conditioning units. The transmission box has a first output shaft and a second output shaft. Each end of the first output shaft is connected to the inner end of the first conditioning member of a corresponding conditioning unit by means of a cardan transmission shaft and each end of the second output shaft is connected to the inner end of the second conditioning member of a corresponding conditioning unit by means of another cardan transmission shaft.

This known agricultural machine for harvesting plant matter does however have some drawbacks.

This is because, to ensure that the conditioning members can move apart correctly to allow greater or lesser amounts of plant matter cut by the cutting members to pass through, it is necessary for the cardan transmission shafts to be of a certain length, and this requires a large amount of space between said conditioning units and means having to have conditioning units which are fairly narrow.

Such a design of an agricultural machine for harvesting plant matter does not allow optimum treatment of the cut plant matter because all of said cut plant matter has to be treated by the two fairly narrow conditioning units.

Furthermore, as described earlier, each conditioning member is connected at each of its ends to a corresponding arm by means of a bearing.

Bearing in mind the fact that there are a number of conditioning members, this construction is fairly expensive.

SUMMARY OF THE INVENTION

The object of the present invention is to overcome the drawbacks of this known agricultural machine for harvesting plant matter.

Thus the agricultural machine for harvesting plant matter according to the invention is one wherein the inner end of each first conditioning member is supported by the corresponding first output shaft, and the transmission device of each second conditioning member couples the outer end thereof to the corresponding second output shaft.

Such an agricultural machine for harvesting plant matter makes it possible to save space, advantageously allowing the harvesting mechanism to be equipped with two very wide conditioning units for optimum treatment of the plant matter.

Furthermore, no specific bearings at the inner end of each first conditioning member are provided, because this inner end is supported by the corresponding first output shaft of the transmission box.

The invention also relates to the following features taken in isolation or in any technically feasible combination:

the coupling connecting the inner end of the first conditioning member of one conditioning unit to the corresponding first output shaft of the transmission box is an elastic coupling especially allowing impacts to be absorbed and vibrations of said first conditioning member and of said first output shaft to be filtered;

the transmission device of each second conditioning member of one conditioning unit includes a pivoting lateral casing situated at the outer end of said second conditioning member;

said transmission device of each second conditioning member of one conditioning unit additionally includes a transmission shaft coupling the corresponding second output shaft to the pivoting lateral casing;

said transmission shaft is coupled to the corresponding second output shaft by means of an elastic coupling especially allowing impacts to be absorbed and vibrations of said transmission shaft and of said second output shaft to be filtered;

the pivoting lateral casing includes an endless transmission the driving wheel of which is coupled to the transmission shaft and the receiving wheel of which is coupled to the second conditioning member;

the endless transmission of the pivoting lateral casing is a chain drive;

the longitudinal axis of said transmission shaft is substantially coincident with the longitudinal axis of the corresponding second output shaft;

the pivoting lateral casing can pivot substantially about the longitudinal axis of the corresponding second output shaft so as to allow the second conditioning member to move away from the first conditioning member while maintaining drive to said second conditioning member;

the pivoting lateral casing is a substantially leaktight casing containing a lubricant so as to reduce the maintenance of the endless transmission;

the second conditioning member of one conditioning unit is connected at its inner end to a pivoting arm capable of pivoting about an axis of pivoting extending close to the longitudinal axis of the corresponding second output shaft and substantially parallel to said longitudinal axis so as to allow said second conditioning member to move away in an at least substantially parallel manner from the first conditioning member;

the articulation defining the axis of pivoting of the pivoting arm is an elastic articulation especially making it possible to absorb impacts and to filter out vibrations coming from said second conditioning member;

the pivoting of the second conditioning member of one conditioning unit allowed by the pivoting lateral casing and the pivoting arm takes place against the action of an elastically deformable member the intensity of the return action of which can be altered using an adjustment device, and this allows the second conditioning member to move away from the first conditioning member and to return to its initial position depending on the amount of cut plant matter passing between said conditioning members;

the elastically deformable member consists of two coaxial torsion bars extending one in the extension of the other and the common longitudinal axis of which is coincident with the axis of pivoting of the pivoting arm;

just one adjustment member is provided per conditioning unit and this acts on the adjacent ends of the corresponding two torsion bars;

the transmission box includes:
  a first single output shaft each end of which forms the first output shaft of the corresponding conditioning unit and
  a second single output shaft each end of which forms the second output shaft of the corresponding conditioning unit;

the transmission box includes a driveshaft coupled to the first single output shaft by means of a first pair of bevel gears and of an endless transmission, and to the second single output shaft by means of a second pair of bevel gears;

the first pair of bevel gears and the second pair of bevel gears have their driving bevel gear in common, and this is borne by the driveshaft;

the driving wheel of the endless transmission of the transmission box is coupled to the receiving bevel gear of the first pair of bevel gears while the receiving wheel of said endless transmission is coupled to the first single output shaft;

the endless transmission of the transmission box is a chain drive;

the driving wheel of the endless transmission of the transmission box and the receiving bevel gear of the first pair of bevel gears form a set which is coaxial with the second single output shaft but not rotationally connected thereto;

the transmission box includes a third output shaft intended to drive the cutting mechanism;

the driveshaft is coupled to the third output shaft by means of a third pair of bevel gears;

the first pair of bevel gears, the second pair of bevel gears and the third pair of bevel gears have their driving bevel gear in common, and this is borne by the driveshaft, which especially allows having a less cumbersome transmission box;

a transmission casing is provided and receives movement from the third output shaft and drives, from above, at least one of the cutting members of the cutting mechanism;

the cutting member(s) driven by the transmission casing is (are) situated substantially in the vertical mid-plane of the machine directed in the direction of travel during work;

the transmission box additionally includes an input casing with an input shaft coupled to the driveshaft by means of a pair of input bevel gears;

the longitudinal axis of the driveshaft is directed upward;

the input casing can occupy several positions by pivoting about the longitudinal axis of the driveshaft;

the various angular positions that the input casing can occupy correspond to various positions that the draw bar can occupy by pivoting about the axis of pivoting defined by the articulation which connects the draw bar to the frame;

the longitudinal axis of the driveshaft is substantially parallel to the axis of pivoting defined by the articulation connecting the draw bar to the frame;

the input shaft of the input casing is coupled to a line of shafts which is at least partially borne by the draw bar;

the transmission box includes:
  a first compartment containing the first pair of bevel gears, the second pair of bevel gears and, as appropriate, the third pair of bevel gears, and
  a second compartment containing the endless transmission;

the second compartment has a drip pan for recovering the oil contained in the second compartment and splashed up by the endless transmission in order to transfer it into the first compartment;

the first compartment has a communication with the second compartment allowing the oil contained in the first compartment to return to the second compartment;

the transmission box additionally includes a pump pumping the oil contained in the first compartment into the input casing, the latter having a communication allowing oil contained therein to return to the first compartment;

the elastic coupling coupling the transmission shaft of a second conditioning member to the second single output shaft includes a flange connected to said second single output shaft, the flange of the coupling of one of these second conditioning members being fixed to the corresponding end of said second single output shaft, while the flange of the coupling of the other second conditioning member is mounted so that it can slide on the corresponding end of said second single output shaft, such an arrangement makes it possible to attach these second conditioning members to the second output shaft even if these members are further apart than anticipated;

the harvesting mechanism additionally includes a carrying structure and the transmission box is connected to said carrying structure by means of three elastic articulations especially making it possible to absorb impacts and to filter out vibrations coming from said harvesting mechanism or from said transmission box in order to protect these latter components;

the harvesting mechanism additionally includes a carrying structure and the outer end of each first conditioning member is supported by said carrying structure by means of an elastic bearing especially making it possible to absorb impacts and filter out vibrations coming from said carrying structure or from the first conditioning member;

the articulation connecting the draw bar to the frame extends substantially in the vertical mid-plane of the machine which plane is directed in the direction of travel during work;

each second conditioning member extends substantially above the corresponding first conditioning member so that during work, the cut plant matter passing between the conditioning members is thrown out at the back of the agricultural harvesting machine.

BRIEF DESCRIPTION OF THE DRAWINGS

Other objectives, features and advantages of the invention will become clear from the following description with reference to the attached drawings which represent, by way of nonlimiting example, one embodiment of the agricultural machine according to the invention for harvesting plant matter.

In these drawings.

DESCRIPTION OF THE PREFERRED EMBODIMENT

FIGS. 1 to 8 show an agricultural machine according to the invention for harvesting plant matter and produced in the form of a mower-conditioner 1. This machine is intended to be hitched to a towing vehicle (not represented) which, during use, pulls it in the direction of travel 2.

In the rest of the description, the following notions: "front", "rear", "in front of" and "behind" are defined with respect to this direction of travel 2 and the notions of "right" and "left" are defined looking at the mower-conditioner 1 from behind in the direction of travel 2.

Figure 1:
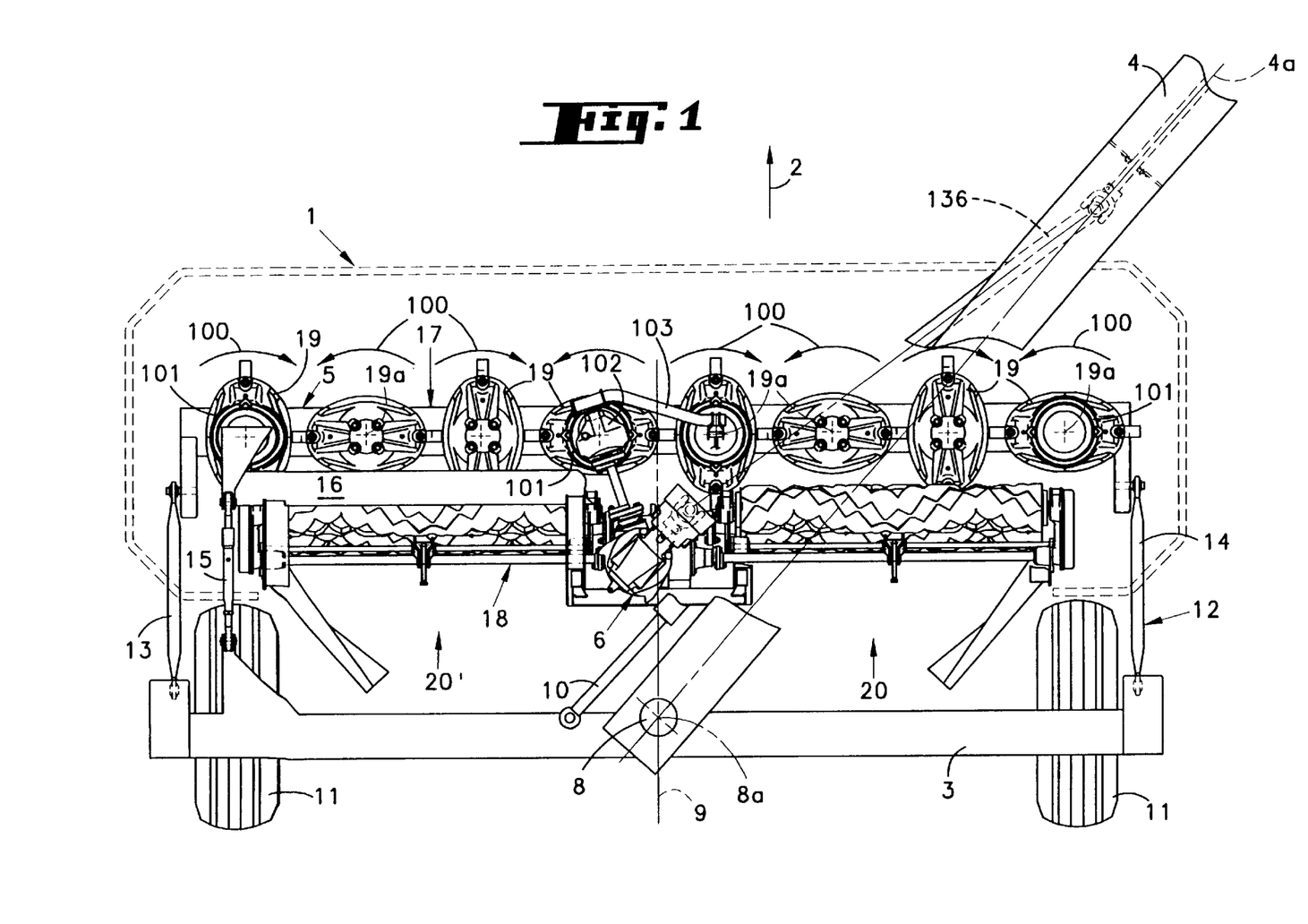
FIG. 1 represents a top view of an agricultural machine for harvesting plant matter, in which a number of part sections have been made.
Figure 2:
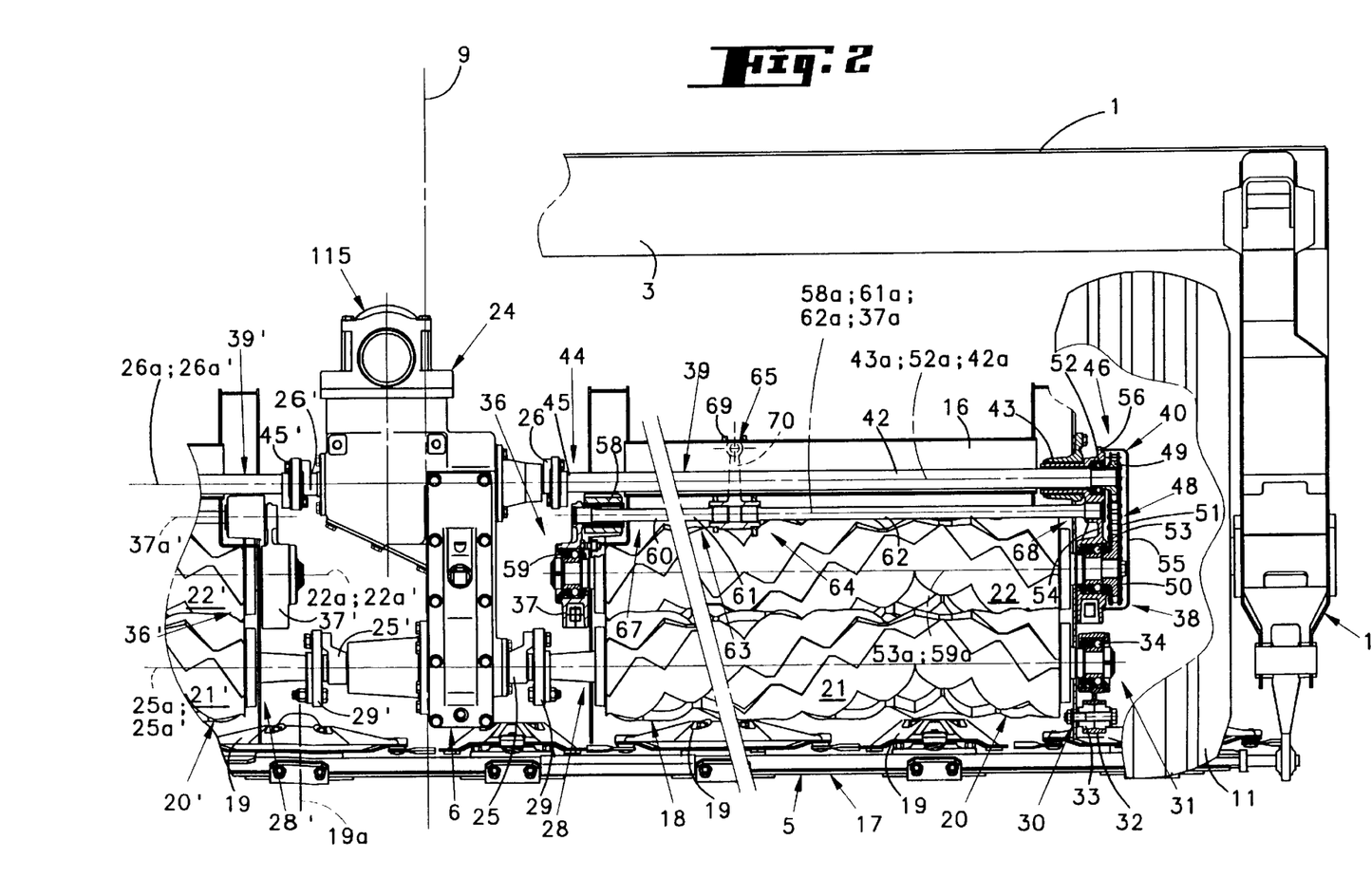
FIG. 2 is a rear view of the agricultural machine of FIG. 1, on a different scale, in which a number of part sections have been made.
Figure 3:
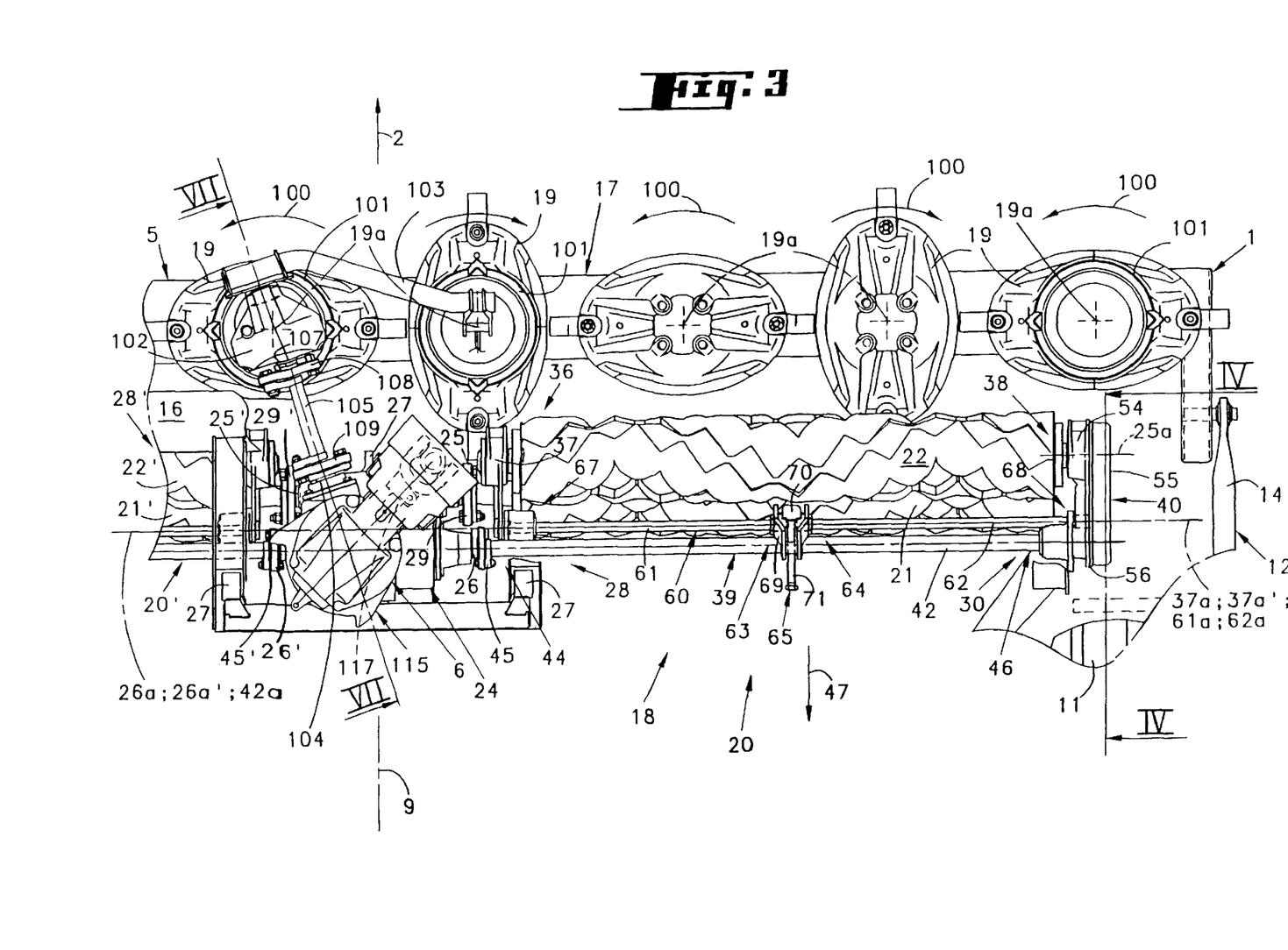
FIG. 3 is a top view of the agricultural machine of FIG. 1 on a different scale and in which a number of part sections have been made.

Broadly speaking, this mower-conditioner 1 includes a mobile frame 3, a draw bar 4, a harvesting mechanism 5 and transmission members 6.

The draw bar 4 is intended to connect the mower-conditioner 1 to the towing vehicle. For this, it is connected at its rear end to the frame 3 by means of an articulation 8 of geometric axis 8a about which it can pivot and at its front end to the towing vehicle in a way known to those skilled in the art. The geometric axis 8a is at least substantially vertical and extends at least substantially in the vertical mid-plane 9 of the mower-conditioner 1 directed in the direction of travel 2 during work. The angular position of the draw bar 4 with respect to the frame 3 can be altered by pivoting said draw bar 4 about the axis 8a of the articulation 8. The desired angular position is achieved and maintained using a hydraulic operating ram 10 (represented partially in FIG. 1), connected to the frame 3 and to the draw bar 4 in a way known to those skilled in the art. Thanks to this arrangement, the mobile frame 3 can, especially during work, extend to the left (FIG. 1) or to the right of the towing vehicle, and this advantageously allows to-and-fro mowing.

The mobile frame 3 rests on the ground by means of two wheels 11 which extend close to the outer ends of said frame 3.

The harvesting mechanism 5 is at least substantially symmetric with respect to the vertical mid-plane 9 and is connected to the mobile frame 3 by means of a suspension device 12 which in the example shown consists of three suspension rods 13, 14, 15: two lower suspension rods 13, 14 and an upper suspension rod 15. These three suspension rods 13, 14, 15 together with the mobile frame 3 and the harvesting mechanism 5 form a deformable quadrilateral which allows said harvesting mechanism 5 to move essentially upward and downward with respect to the mobile frame 3 in order to adapt to the relief of the ground independently of said mobile frame 3. This harvesting mechanism 5 includes a carrying structure 16 to which is connected a cutting mechanism 17 and a conditioning device 18. The cutting mechanism 17 is equipped with cutting members 19 which, in the example represented, are rotating discs each intended to rotate about a respective axis of rotation 19a and which are arranged one beside the other in a line extending at right angles to the direction of travel 2.

The conditioning device 18 comprises two substantially identical conditioning units 20, 20'. The various elements of the conditioning unit 20' are substantially identical to the elements of the conditioning unit 20 and will be given the same reference number followed by the '(prime) symbol.

The various elements of the conditioning unit 20' will be described only if it proves necessary to do so.

The conditioning units 20, 20' are driven by transmission members 6 and extend substantially in the extension of one another and behind the cutting mechanism 17.

Each conditioning unit 20, 20' includes two contra-rotating conditioning members 21, 21'; 22, 22' which can move apart and between which the plant matter cut by cutting members 19 is intended to pass in order to be thrown out at the back. In the example represented, the conditioning member 21, 22 is a roll known to those skilled in the art and extending substantially horizontally and at right angles to the direction of travel 2 and having on its periphery ribs which are intended to interact with cutouts in the nearby roll. The second conditioning member 22 is situated substantially above the corresponding first conditioning member 21 and a little further forward than the latter.

The transmission members 6 include a transmission box 24 extending between the two conditioning units 20, 20' and including, for each of these, a first output shaft 25, 25' and a second output shaft 26, 26'. This transmission box 24 is connected to the carrying structure 16 of the harvesting mechanism 5 by means of three elastic articulations 27 which are especially intended to absorb impacts and to filter out vibrations coming from the harvesting mechanism 5 or from said transmission box 24 in order to improve the working conditions and the life of these components.

The inner end 28 of the first conditioning member 21 situated closest to the vertical mid-plane 9 is connected by means of an elastic coupling 29 to the corresponding first output shaft 25 and is supported by the latter, while the outer end 30 of said first conditioning member 21 is supported by the carrying structure 16 by means of an elastic bearing 31. In the example represented, this elastic bearing 31 is composed of a support arm 32 connected at one of its ends to the carrying structure 16 by means of an elastic articulation 33 and at the other of its ends to the outer end 30 of the first conditioning member 21 by means of a bearing 34.

The elastic articulation 33 is intended to absorb impacts and filter out vibrations coming from the carrying structure 16 or from the first conditioning member 21 so as to protect the various elements and especially the bearing 34 in order to make these components more reliable and increase their life. The elastic bearing 31 and the elastic coupling 29 respectively connecting the first conditioning member 21 to the carrying structure 16 and to the first output shaft 25 allow only small-amplitude radial movements of said first conditioning member 21.

Figure 4:
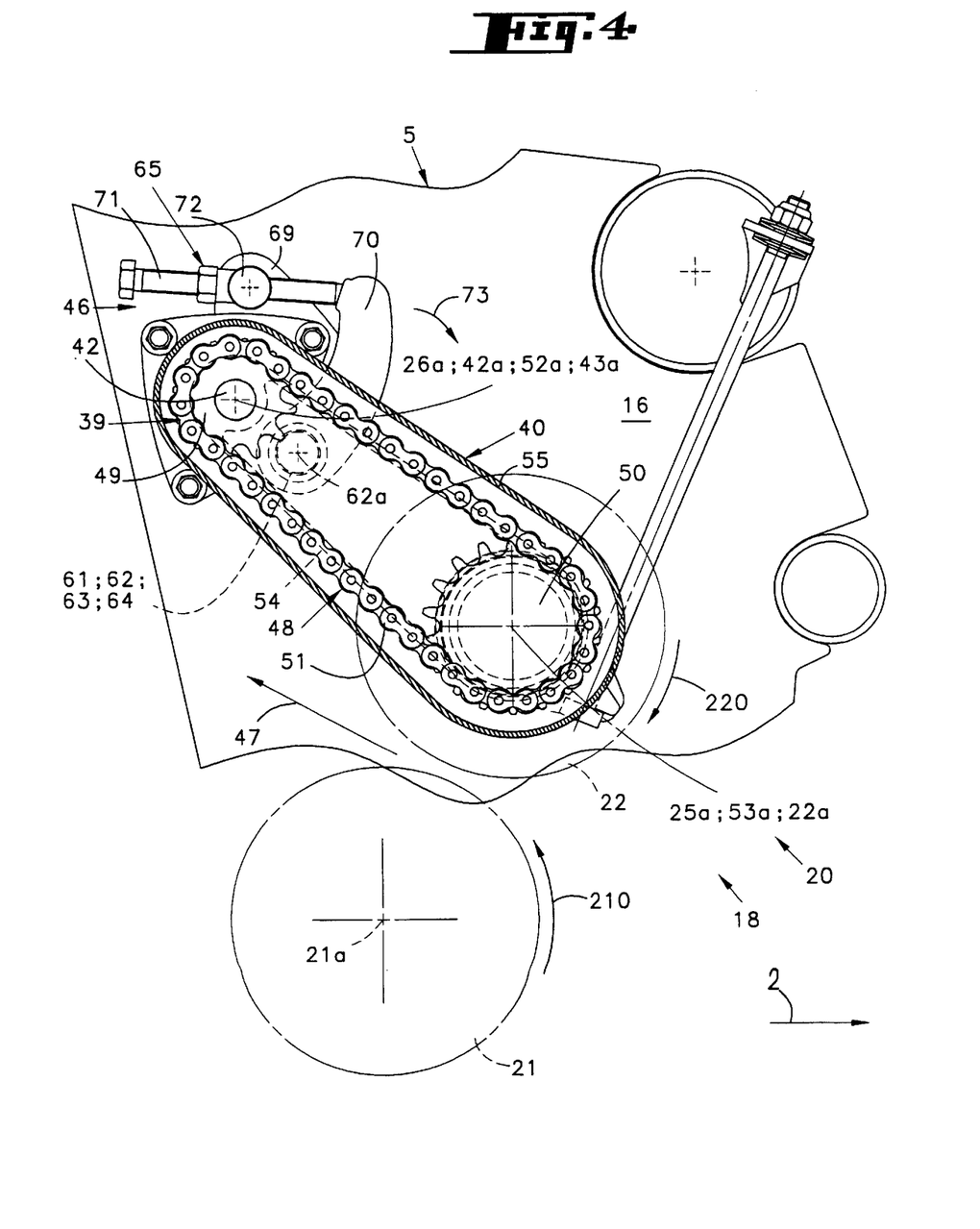
FIG. 4 is a section on plane IV-IV defined in FIG. 3.

The second conditioning member 22 can move away from the first conditioning member 21 while remaining at least substantially parallel, so as to allow a greater or lesser amount of plant matter cut by the cutting members 19 to pass between said conditioning members 21, 22.

For this, the second conditioning member 22 of the conditioning unit 20 is connected at its inner end 36 to a pivoting arm 37 capable of pivoting about an axis of pivoting 37a.

At its outer end 38 the second conditioning member 22 is connected to the second output shaft 26 of the transmission box 24 by means of a transmission device 39 capable of pivoting about the longitudinal axis 26a of said second output shaft 26.

The axis of pivoting 37a of the pivoting arm 37 extends near to the longitudinal axis 26a of the corresponding second output shaft 26 at least substantially parallel also to the longitudinal axis 26a so to allow said second conditioning member 22 to move away from the first conditioning member 21, remaining at least substantially parallel.

This transmission device 39 for the second conditioning member 22 includes a pivoting lateral casing 40 and a transmission shaft 42.

This pivoting lateral casing 40 is situated at the outer end 38 of the second conditioning member 22 and is connected to the carrying structure 16 by means of a cylindrical articulation 43 the longitudinal axis 43a of which is at least substantially horizontal and parallel to the longitudinal axis 22a of said second conditioning member 22. From examining FIG. 4 it may be seen that the pivoting lateral casing 40 is inclined forward and downward in such a way that the longitudinal axis 22a of the second conditioning member 22 is situated in front of and below the longitudinal axis 43a of the cylindrical articulation 43. It will also be noted that the longitudinal axis 21a of the first conditioning member 21 is situated lower down than the longitudinal axis 22a and in a vertical plane sited between the longitudinal axes 22a, 43a so that the cut plant matter passing between the conditioning members 21, 22 which are driven in rotation in the directions 210, 220 are thrown out backward and upward in the direction of ejection 47.

At its inner end 44, the transmission shaft 42 is coupled to the corresponding second output shaft 26 of the transmission box 24 by means of an elastic coupling 45 especially making it possible to absorb impacts and filter out vibrations from said transmission shaft 42 and from said second output shaft 26. At its outer end 46 the transmission shaft 42 is connect to an endless transmission 48 belonging to the pivoting lateral casing 40. In the example represented, this endless transmission 48 is a chain drive including a driving wheel 49 fixed to the outer end 46 of the transmission shaft 42 and a receiving wheel 50 fixed to the second conditioning member 22, the two wheels 49, 50 being connected to one another by a chain 51. At its outer end 46 the transmission shaft 42 is connected to the pivoting lateral casing 40 by means of a cylindrical articulation 52 of longitudinal axis 52a. At its outer end 38 the second conditioning member 22 is also connected to the pivoting lateral casing 40 by means of a cylindrical articulation 53 the longitudinal axis 53a of which is at least substantially coincident with the longitudinal axis 22a.

From examining FIGS. 2 and 4 it may further be seen that the longitudinal axes 26a, 42a, 43a, 52a of the second output shaft 26, of the transmission shaft 42 and of the cylindrical articulations 43, 52 respectively are at least substantially coincident, and this allows the pivoting lateral casing 40 to pivot about said longitudinal axis 26a of said second output shaft 26 while maintaining drive to the second conditioning member 22. It will further be observed that the pivoting lateral casing 40 is a casing which is substantially leaktight containing a lubricant intended to reduce the wear and heating of the endless transmission 48. For this, the pivoting lateral casing 40 includes a support 54 to which is attached a cover 55 enclosing the endless transmission 48; a tight joint 56 intended to seal the pivoting lateral casing 40 is provided between said support 54 and said cover 55.

At one of its ends the pivoting arm 37 has an elastic articulation 58 which connects it on the one hand to the carrying structure 16 and on the other hand defines the axis of pivoting 37a of said pivoting arm 37, said elastic articulation 58 additionally making it possible to absorb impacts and filter out vibrations coming from the second conditioning member 22. At the other end, the pivoting arm 37 is connected to the inner end 36 of the second conditioning member 22 by means of a cylindrical articulation 59 the longitudinal axis 59a of which is at least substantially coincident with the longitudinal axis 22a of said second conditioning member 22.

The pivoting of the second conditioning member 22 of the conditioning unit 20 as allowed by the pivoting lateral casing 40 and the pivoting arm 37 takes place against the action of an elastically deformable member 60 which, in the example represented, consists of two coaxial torsion bars 61, 62 extending one in the extension of the other and the longitudinal axes 61a, 62a of which are coincident with the axis of pivoting 37a of the pivoting arm 37.

From examining FIGS. 2 and 4 it may be seen that the two torsion bars 61, 62 are situated in front of the transmission shaft 42 and a little lower down than the latter.

The two torsion bars 61, 62 are adjacent at their corresponding central ends 63, 64 and are connected to an adjustment member 65. The inner end 67 of the torsion bar 61 is fixed to the pivoting arm 37 in such a way that the longitudinal axis 61*a* is coincident with the longitudinal axis 58*a* of the elastic articulation 58. The outer end 68 of the torsion bar 62 is fixed to the support 54 of the pivoting lateral casing 40. The adjustment member 65 allows the intensity of the return action of the two torsion bars 61, 62 to be adjusted, and this allows the second conditioning member 22 to move away from the first conditioning member 21 and to return to its initial position as a function of the amount of cut plant matter passing between said conditioning members 21, 22. This adjustment member 65 is situated substantially midway between the elastic articulation 58 and the pivoting lateral casing 40 and acts on the adjacent ends 63, 64 of the two torsion bars 61, 62.

The adjustment member 65 includes a bearing support 69 fixed to the carrying structure 16. Housed, so that it can pivot, in the lower part of the bearing support 69 is a rocking lever 70 which at its lower part receives the central ends 63, 64 of the corresponding two torsion bars 61, 62. Bearing against the upper part of the rocking lever 70 is an adjustment screw 71 screwed into a journal 72 mounted so that it can pivot in the upper part of the bearing support 69.

When the operator wishes to increase the intensity of the return action of the two torsion bars 61, 62, which amounts to increasing the intensity with which the cut plant matter passing between the corresponding conditioning members 21, 22 is conditioned, he screws (see rear view, FIG. 2) the adjustment screw 71 clockwise, which tilts the rocking lever 70 forward in the direction of the arrow 73, and this has the effect of twisting the two torsion bars 61, 62.

The transmission box 24 may be seen from examining FIGS. 5 to 8. It will be observed that each first output shaft 25, 25' connected to the first conditioning member 21, 21' of one conditioning unit 20, 20' is formed by one end of a first single output shaft 75 and that the second output shaft 26, 26' connected to the second conditioning member 22, 22' of one conditioning unit 20, 20' is formed by one end of a second single output shaft 76. The longitudinal axes 75*a,* 76*a* of the two single output shafts 75, 76 coincide with the longitudinal axes 25*a,* 25*a'*; 26*a,* 26*a'* of the output shafts 25, 25'; 26, 26' and extend at least substantially horizontally and transversely with respect to the direction of travel 2. It may be seen that the longitudinal axis 75*a* of the first single output shaft 75 is situated lower down and in front of the longitudinal axis 76*a* of the second single output shaft 76.

Figure 5:
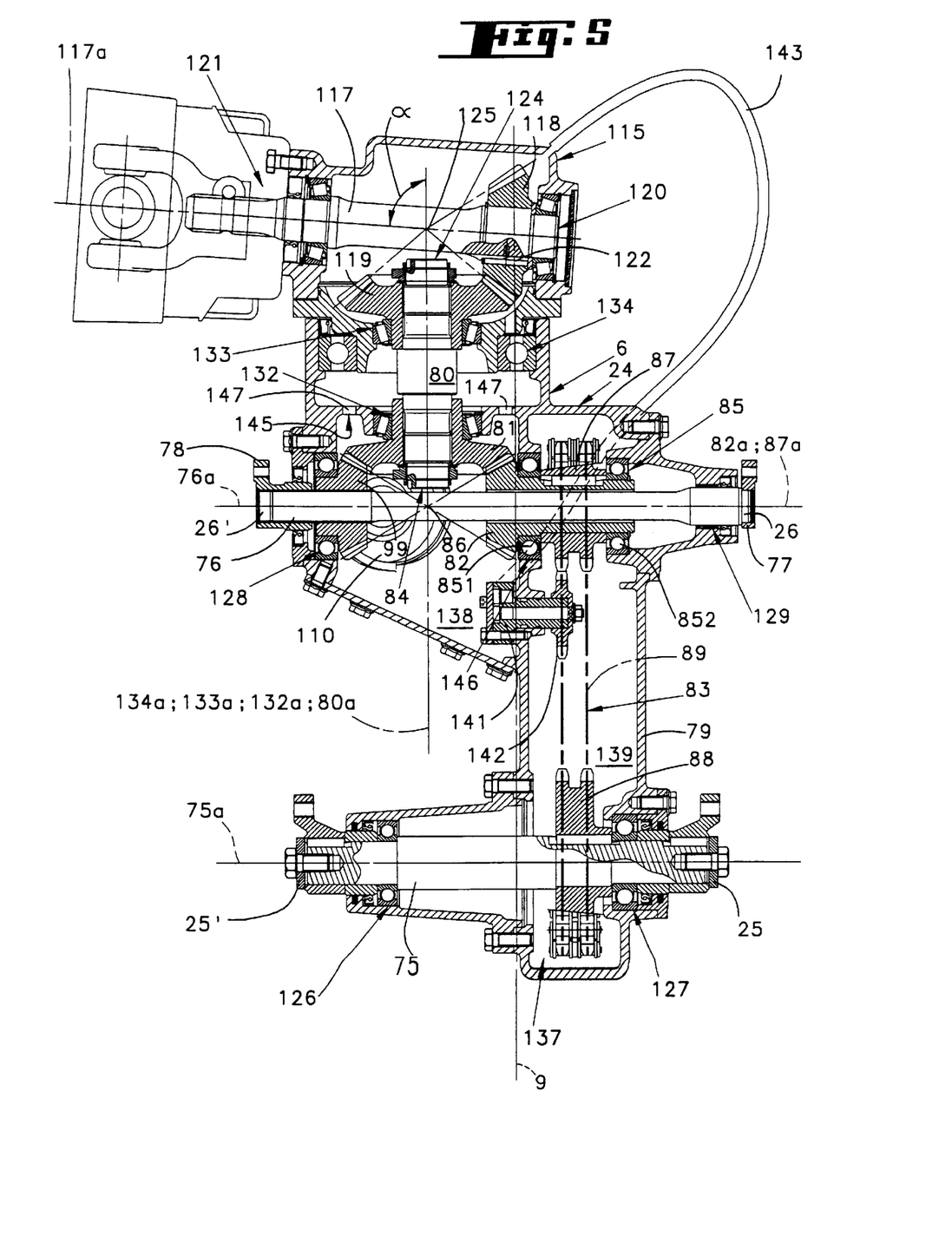
FIG. 5 is a sectional rear view of the transmission box alone, to a different scale and with the input casing pointing in the sectioning plane.
Figure 6:
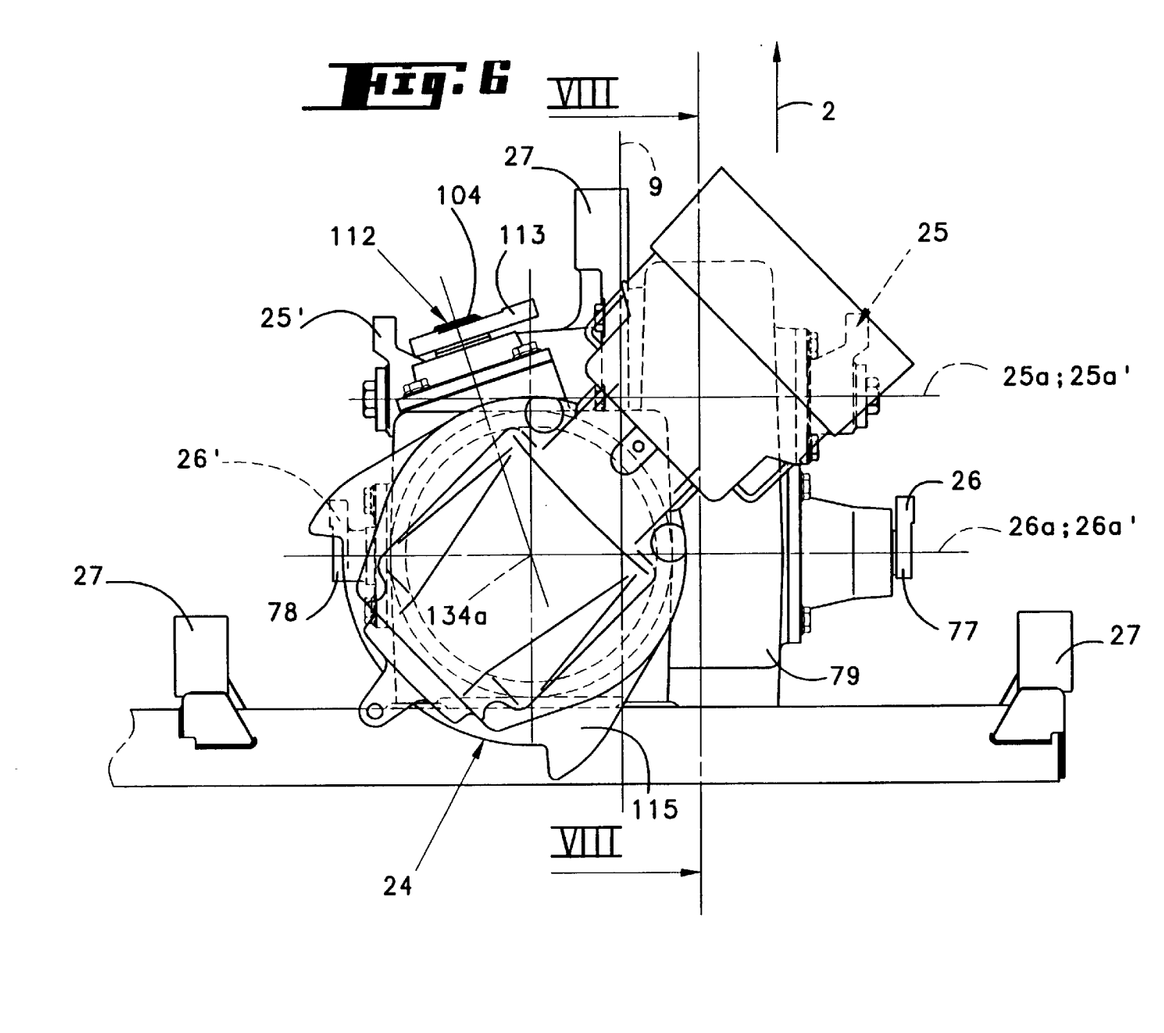
FIG. 6 is a top view of the transmission box alone on a different scale.

It will be noted that the elastic coupling 45, 45' coupling the transmission shaft 42, 42' of the transmission device 39, 39' to the second single output shaft 76 includes a flange 77, 78 connected to said second single output shaft 76. The flange 77 situated at the right-hand end of the second single output shaft 76 is fixed to the latter, while the flange 78 is mounted so that it can slide on the left-hand end of said second single output shaft 76, and this allows the two second conditioning members 22, 22' of the conditioning units 20, 20' to be attached to said second single output shaft 76 even if these units are further apart than anticipated.

It will also be noted that the transmission box 24 includes a leaktight main casing 79 and a driveshaft 80 of longitudinal axis 80*a* which is coupled to the first single output shaft 75 by means of a first pair of bevel gears 81–82 and of an endless transmission 83. The longitudinal axis 80*a* of the driveshaft 80 is directed upward, more specifically, it extends at least substantially vertically in the region of the vertical mid-plane 9 and is at least substantially parallel to the axis of pivoting 8*a* defined by the articulation 8 which connects the draw bar 4 to the frame 3.

The driving bevel gear 81 of the first pair of bevel gears 81–82 is borne by the driveshaft 80, more specifically, said driving bevel gear 81 is fixed to the lower end 84 of said driveshaft 80 in such a way that its teeth extend downward. The receiving bevel gear 82 of the first pair of bevel gears 81–82 is guided in rotation in the main casing 79 by means of a bearing 85 which, in the example represented, is composed of two ball bearings 851, 852 in such a way that its longitudinal axis 82*a* is at least substantially coincident with the longitudinal axis 76*a* of the second single output shaft 76.

The receiving bevel gear 82 meshes with the driving bevel gear 81 in such a way that the teeth on said receiving bevel gear 82 extend to the left and converge toward the same point 86 as the teeth of said first bevel gear 81.

Figure 8:
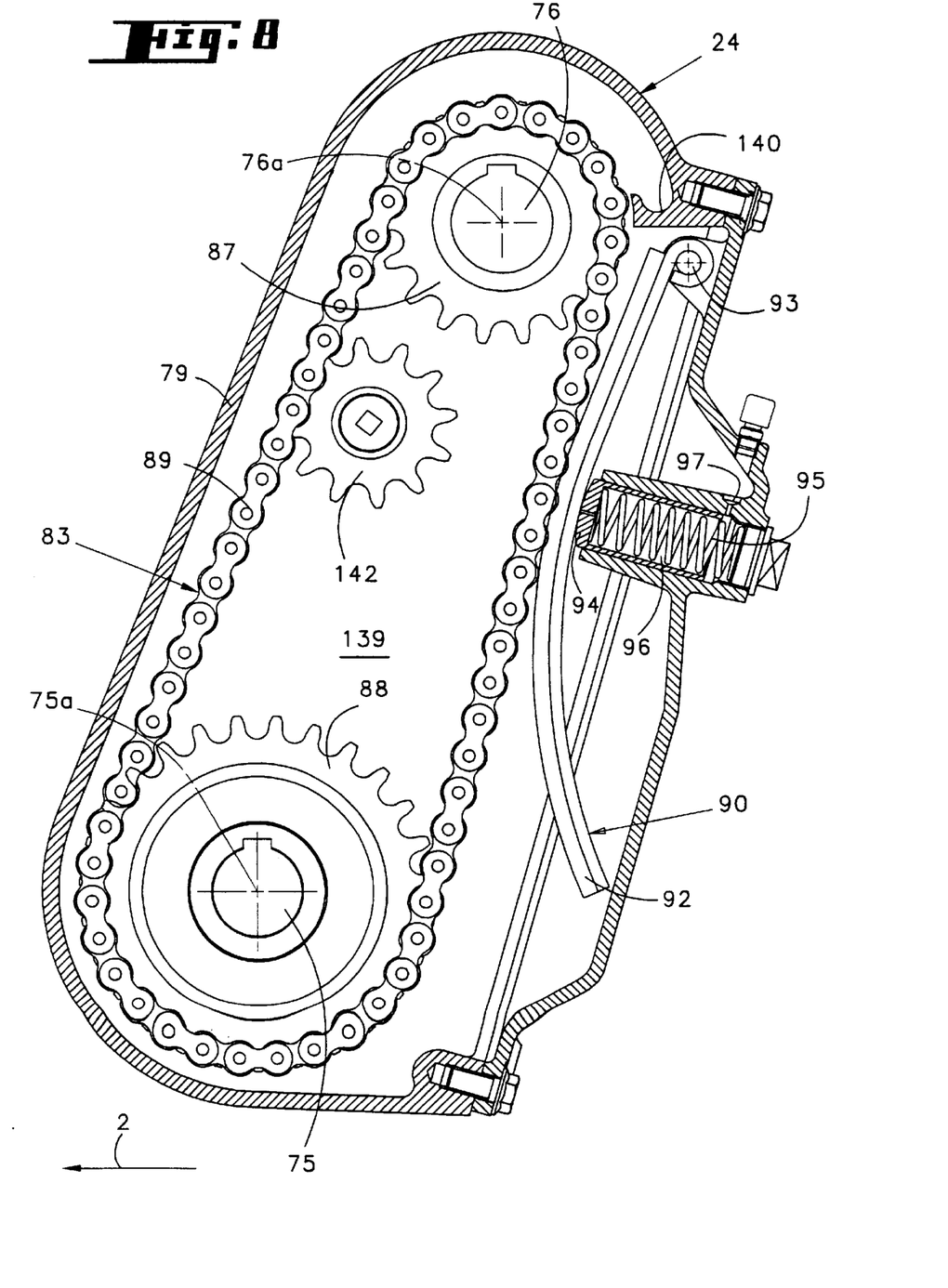
FIG. 8 is a section on plane VIII—VIII defined in FIG. 6.

In the example represented, the endless transmission 83 is a chain drive which includes a driving wheel 87, a receiving wheel 88 and a chain 89 connecting the two wheels 87, 88.

The driving wheel 87 is coupled rigidly to the receiving bevel gear 82 in such a way that the longitudinal axis 87*a* of said driving wheel 87 is coincident with the longitudinal axis 82*a* of said receiving bevel gear 82 so as to form a set 82-87 which is coaxial with the second single output shaft 76. For this, said second single output shaft 76 extends longitudinally through the set 82–87 without being connected thereto, and this allows said single output shaft 76 to rotate about the same axis of rotation as said set 82–87, at a different speed. The receiving wheel 88 for its part is rigidly coupled to the first single output shaft 75.

From examining FIG. 8, it may be seen that the endless transmission 83 is also provided with a chain tensioner 90 including a shoe 92 articulated to the main casing 79 by means of an articulation 93. Behind the shoe 92 is a piston 94 guided in the main casing 79 and which, when combined with a compression spring 95, presses the shoe 92 onto the chain 89 so as to tension the latter. The piston 94 and the compression spring 95 extend into a chamber 96 formed by the main casing 79. It will be seen that the main casing 79 has an orifice 97 opening into the chamber 96 and which allows some of the lubricant contained in the main casing 79 to enter said chamber 96 and occupy it, which advantageously allows the movements of the piston 94 brought about by the flapping of the chain 89 to be absorbed as the mower-conditioner 1 is running.

It will be noted that in the example represented, the driving wheel 87 and the receiving wheel 88 of the endless transmission 83 are double wheels and that the chain 89 is a double chain.

The driveshaft 80 of the transmission box 24 is also coupled to the second single output shaft 76 by means of a second pair of bevel gears 81–99. It will be observed that the second pair of bevel gears 81–99 has the same driving bevel gear 81 as the first pair of bevel gears 81–82. For this, the second pair of bevel gears 81–99 is formed by the driving bevel gear 81 described earlier and by a receiving bevel gear 99 fixed coaxially to the second single output shaft 76. The receiving bevel gear 99 meshes with the driving bevel gear 81 in such a way that the teeth of said receiving bevel gear 99 extend to the right and converge toward the same point 86 as the teeth of said bevel gears 81 and 82.

Each cutting member 19 of the cutting mechanism 17 is intended to be driven in rotation about its axis of rotation 19*a* in the respective direction of rotation 100.

It will be observed that the cutting members 19 situated at the ends of the cutting mechanism 17 and the cutting members 19 adjacent to the vertical mid-plane 9 have a respective windrowing hood 101 extending above the corresponding cutting member 19. Along the cutting width, the directions of rotation 100 of the cutting members 19 situated at the ends of the cutting mechanism 17 converge, while the directions of rotation 100 of the cutting members 19 adjacent to the vertical mid-plane 9 diverge. Such an arrangement especially allows the cut plant matter to be windrowed to either side toward the corresponding conditioning units 20, 20'.

The cutting members 19 are intended to be driven in rotation by a driving cutting member 19. In this embodiment, the cutting members 19 are driven by the driving cutting member 19 situated to the left of the vertical mid-plane 9 and adjacent thereto.

For this, there is provided a transmission casing 102 arranged on the one hand above the windrowing hood 101 of the driving cutting member 19 so as to drive the latter from above, and on the other hand at the windrowing hood 101 of the adjacent cutting member 19 situated on the other side of the vertical mid-plane 9 by means of an immobilizing bar 103. Such an arrangement on the one hand allows the transmission casing 102 to be immobilized and allows the windrowing hoods 101 of the corresponding two cutting members 19 to be stiffened.

The transmission casing 102 receives the movement from a third output shaft 104 belonging to the transmission box 24. For this, an intermediate transmission shaft 105 is provided which extends at least substantially horizontally and transversely to the direction of travel 2. Said intermediate transmission shaft 105 is connected at one of its ends to an input shaft 107 of the transmission casing 102 by means of an elastic coupling 108 similar to the elastic coupling 45 connecting the transmission shaft 42 to the second output shaft 26. At the other of its ends, the intermediate transmission shaft 105 is connected to the third output shaft 104 of the transmission box 24 by means of an elastic coupling 109 similar to the coupling 108. It will be noted that the input shaft 107 of the transmission casing 102 can be moved little along its longitudinal axis 107a which allows said input shaft 107 to be coupled to the third output shaft 104 by means of the shaft 105 and of the elastic couplings 108, 109 even if said shafts 104, 107 are further apart than anticipated.

The third output shaft 104 extends substantially horizontally and transversely to the direction of travel 2 and is directed in the direction of the transmission casing 102. The longitudinal axis 104a of the third output shaft 104 passes through the point 86 defined earlier.

Figure 7:
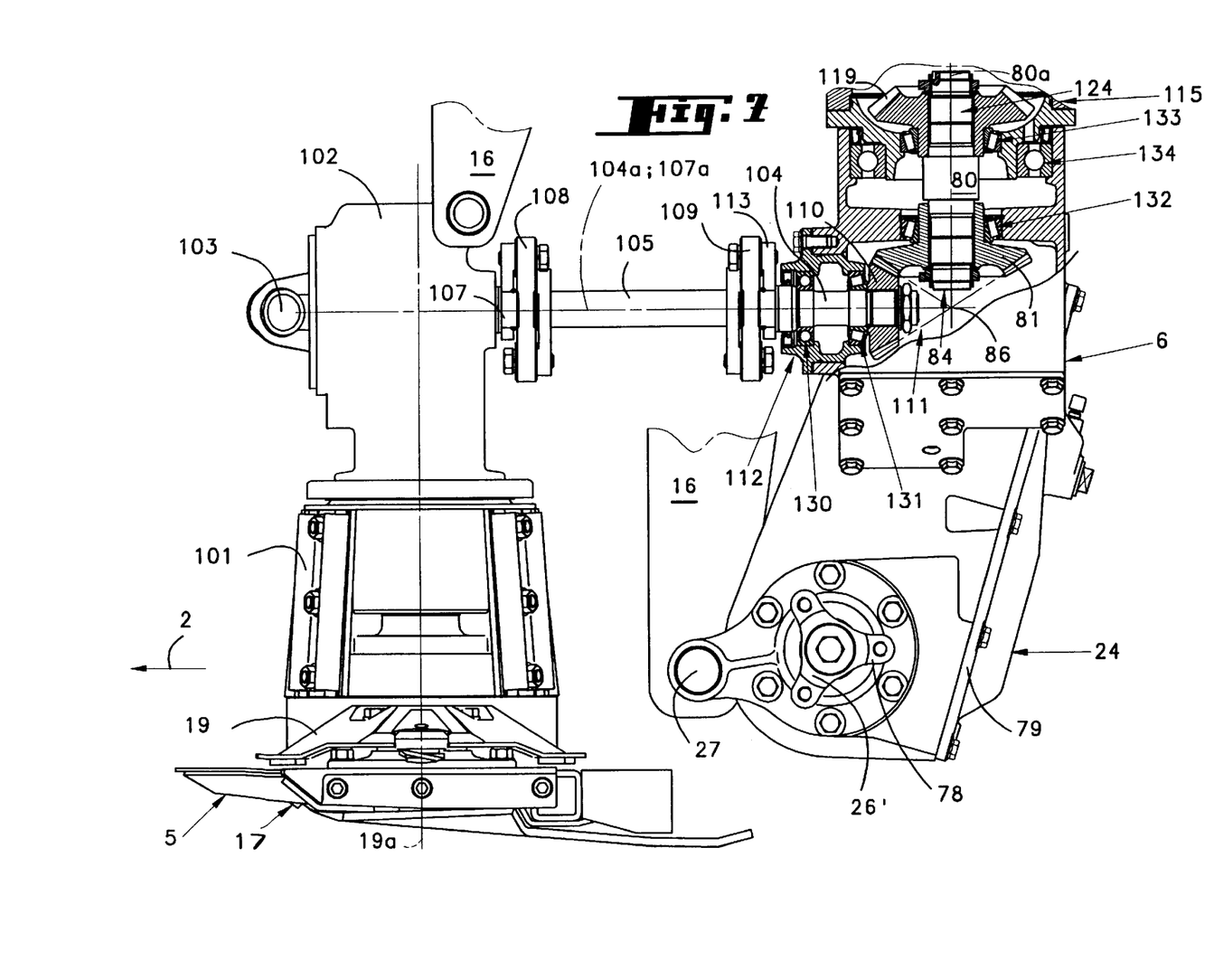
FIG. 7 is a section on plane VII—VII defined in FIG. 3.

From examining FIG. 7 it may be seen that the driveshaft 80 is also coupled to the third output shaft 104 by means of a third pair of bevel gears 81–110. This third pair of bevel gears 81–110 has the same driving bevel gear 81 as the first and second pairs of bevel gears 81–82, 81–99. For this, the third pair of bevel gears 81–110 is formed by the driving bevel gear 81 described earlier and by a receiving bevel gear 110 fixed coaxially to the end 111 of the third output shaft 104 extending inside of the main casing 79.

The receiving bevel gear 110 meshes with the driving bevel gear 81 in such a way that the teeth of said receiving bevel gear 110 extend transversely backward and converge toward the same point 86 as the teeth of the bevel gears 81, 82, 99.

The end 112 of the third output shaft 104 extends outside of the main casing 79 and includes a flange 113 fixed to this end, said flange 113 forming part of the elastic coupling 109.

The transmission box 24 additionally includes an input casing 115 arranged so that it can pivot on the top of the main casing 79.

The input casing 115 includes an input shaft 117 of longitudinal axis 117a extending, seen from above, substantially parallel to the longitudinal axis 4a of the draw bar 4. When viewed from the side of the input casing 115, as represented in FIG. 5, the longitudinal axis 117a forms an angle a of greater than 90° with the longitudinal axis 80a. In other words, the longitudinal axis 117a of the input shaft 117 is intended to extend substantially horizontally when the harvesting mechanism 5 is occupying a so-called normal work position, said normal work position being the one in which said harvesting mechanism 5 is inclined slightly forward and downward so as to bring the cutting members 19 closer to the ground for cutting plant matter relatively close to the ground.

The input shaft 117 of the input casing 115 is coupled to the driveshaft 80 by means of a pair of input bevel gears 118–119.

The driving bevel gear 118 of said pair 118–119 is connected coaxially to one 120 of the ends 120, 121 of the input shaft 117 by means of a free wheel 122 which is intended to allow the movement of said input shaft 117 to be transmitted to said driving bevel gear 118, but not allow movement to be transmitted in the opposite direction.

The receiving bevel gear 119 of said pair 118–119 is fixed coaxially to the upper end 124 of the driveshaft 80.

The teeth of the receiving bevel gear 119 extend upward and the teeth of the driving bevel gear 118 extend toward the other end 121 of the input shaft 117. The receiving bevel gear 119 meshes with the driving bevel gear 118 in such a way that their teeth converge toward a point 125 at which the longitudinal axes 80a and 117a of the driveshaft 80 and of the input shaft 117 intersect.

From examining FIGS. 5 and 7 it may be seen that the first single output shaft 75, the second single output shaft 76 and the third output shaft 104 are each guided in rotation in the main casing 79 by means of two respective bearings 126, 127; 128, 129; 130, 131.

The lower end 84 of the driveshaft 80 is guided in rotation in the main casing 79 by means of a bearing 132, while the upper end 124 of said driveshaft 80 extends inside of the input casing 115 in which it is guided therein by means of a bearing 133, said input casing 115 itself being guided in rotation inside said main casing 79 by means of a bearing 134 the longitudinal axis 134a of which is coincident with the longitudinal axis 80a of said driveshaft 80 and the longitudinal axes 132a, 133a of the bearings 132, 133.

Such an arrangement of the input casing 115 allows the latter to pivot about its axis of pivoting embodied by the longitudinal axis 134a of the bearing 134 while maintaining the transmission of movement from the input shaft 117 to the output shafts 75, 76, 104.

The mower-conditioner 1 also includes a line of shafts 136 which is borne at least partially by the draw bar 4. This line of shafts 136 is on the one hand connected to a power take-off (not represented) of the motor vehicle and on the other hand to the input shaft 117 of the input casing 115.

To ensure good transmission of rotational movement from the power take-off of the motor vehicle to the input shaft 117 of the input casing 115, the various angular positions that the latter can occupy are intended to correspond to various positions that the draw bar 4 may occupy by pivoting about the longitudinal axis 8a of the articulation 8. For this, a control means (not represented) is provided, this being intended to pivot the input casing 115 as a function of the position that the draw bar 4 may occupy.

To ensure that the transmission box 24 works correctly, a lubricating device 137 with oil is provided. For this, the first pair of bevel gears 81–82, the second pair of bevel gears 81–99 and the third pair of bevel gears 81–110 are contained in a first compartment 138 of the main casing 79 and the endless transmission 83 is contained in a second compartment 139.

The second compartment 139 has a drip pan 140 recovering oil splashed up by the chain 89 of the endless transmission 83 contained in said second compartment 139 in order to transfer it to the first compartment 138 of the main casing 79.

Provided at the bottom of the first compartment 138 is a hydraulic pump 141 driven by the chain 89 via a drive wheel 142. This hydraulic pump 141 pumps the oil contained in the first compartment 138 into the input casing 115 by means of a hose 143 emerging in the upper part of said input casing 115.

It will additionally be noted that the input casing 115 includes a communication 145 which allows the oil contained therein to return to the first compartment 138. The first compartment 138 for its part has a communication 146 with the second compartment 139 allowing oil contained in the first compartment 138 to return to said second compartment 139.

According to the embodiment shown, the communication 145 between the input casing 115 and the first compartment 138 is achieved by means of holes 147 allowing oil contained in said input casing 115 to flow back into the first compartment 138.

During running, the hydraulic pump 141 is completely immersed in the stationary oil in the bottom of the first compartment 138.

The oil level is determined by the ball bearing 851 of the bearing 85 situated between the receiving bevel gear 82 of the first pair 81–82 and the driving wheel 87. This is because excess oil contained in the first compartment 138 can return to the second compartment 139 by flowing through the ball bearing 851, said ball bearing 851 forming the communication 146 between said first compartment 138 and said second compartment 139.

The mower-conditioner 1 is driven as follows: the power take-off of the motor vehicle (not represented) drives the line of shafts 136 which is borne by the draw bar 4 in rotation, which line itself drives the input shaft 117 of the input casing 115. The movement within the input casing 115 and within the main casing 79 of the transmission box 24 passes in turn through the input shaft 117, the free wheel 122, the driving bevel gear 118, the receiving bevel gear 119, the driveshaft 80 and the driving bevel gear 81. The movement is then transmitted simultaneously to the receiving bevel gear 82, the receiving bevel gear 99 and the receiving bevel gear 110.

The transmission of movement from the receiving bevel gear 82 thereafter passes in turn through the driving wheel 87 of the endless transmission 83, the chain 89, and the receiving wheel 88 to reach the first single output shaft 75.

From the receiving bevel gear 99 the movement is then transmitted directly to the second single output shaft 76.

From the receiving bevel gear 110, the movement is passed on directly to the third output shaft 104 in order then to pass on in turn to the intermediate transmission shaft 105 and the input shaft 107 of the transmission casing 102 which drives the corresponding driving cutting member 19.

From the first single output shaft 75, the movement is transmitted directly on each side to the first conditioning member 21, 21' of the conditioning units 20, 20'.

From the second single output shaft 76, the movement passes on in turn, on each side, through the transmission shaft 42, 42', the driving wheel 49, 49', the chain 51, 51' and the receiving wheel 50, 50' of the corresponding pivoting lateral casing 40, 40' and via the corresponding second conditioning member 22, 22' of the conditioning units 20, 20'.

The lubricating device 137 with oil of the transmission box 24 operates as follows: at a standstill, some of the oil lies at the bottom of the second compartment 139 and some lies at the bottom of the first compartment 138 up to level with the ball bearing 851.

When the machine is started up and running, oil contained in the second compartment 139 is splashed up by the chain 89 and recovered by the drip pan 140, the latter opening into the first compartment 138 pours out the oil collected therein. The oil contained at the bottom of the first compartment 138 is pumped by the hydraulic pump 141 into the input casing 115 by means of the hose 143 which extends partially outside the main casing 79 and partially outside the input casing 115. The oil injected into the input casing 115 runs under gravity toward the bottom of the first compartment 138, passing through the holes 137 and as it passes lubricating the various elements contained in said input casing 115 and said first compartment 138. Excess oil contained at the bottom of the first compartment 138 flows back down to the bottom of the second compartment 139 passing through the ball bearing 851 of the bearing 85 and as it passes lubricating the various elements contained in said second compartment 139.

The oil in the lubrication device 137 circulates in closed circuit within the transmission box 24.

Finally, various modifications are still possible, especially as regards the construction of the various elements, or by substituting technical equivalents, without in any way departing from the field of protection defined in the claims.

In particular, it is entirely possible for the endless transmissions 48, 83 of the pivoting lateral casing 40 and of the main casing 79 to be belt drives or a series of gears.

It is also perfectly conceivable for the conditioning members 21, 21'; 22, 22' of the conditioning units 20, 20' to differ from those represented in the figures.

It is furthermore perfectly conceivable for the transmission box 24 not to include a third output shaft 104 and for the cutting members 19 of the cutting mechanism 17 to be driven by some means other than the one described earlier.

What is claimed as new and desired to be secured by Letter Patent of the United States is:

1. An agricultural machine for harvesting plant matter including:
   a mobile frame,
   a draw bar intended to connect said agricultural machine for harvesting plant matter to a towing vehicle and itself connected to the frame by means of an articulation in such a way that it can pivot about an upward-directed axis of pivoting,
   a harvesting mechanism connected to the mobile frame and including:
      a cutting mechanism comprising cutting members intended to cut the plant matter, and
      a conditioning device comprising two conditioning units extending substantially in the extension of one another and each equipped with two contra-rotating conditioning members which can move apart and between which the plant matter cut by the cutting members is intended to pass in order to be treated, transmission members intended to impart movement to the conditioning units and comprising a transmission box extending between the two conditioning units and including for each of these:

a first output shaft connected, by means of a coupling, to the inner end of the first conditioning member close to the transmission box, and a second output shaft coupled, by means of a transmission device, to the second conditioning member, wherein:

the inner end of each first conditioning member is supported by the corresponding first output shaft, and the transmission device of each second conditioning member couples the outer end thereof to the corresponding second output shaft.

2. An agricultural machine for harvesting plant matter as claimed in claim 1, wherein the coupling connecting the inner end of the first conditioning member of one conditioning unit to the corresponding first output shaft of the transmission box is an elastic coupling.

3. An agricultural machine for harvesting plant matter as claimed in claim 1, wherein the transmission device of each second conditioning member of one conditioning unit includes a pivoting lateral casing situated at the outer end of said second conditioning member.

4. An agricultural machine for harvesting plant matter as claimed in claim 3, wherein said transmission device of each second conditioning member of one conditioning unit additionally includes a transmission shaft coupling the corresponding second output shaft to the pivoting lateral casing.

5. An agricultural machine for harvesting plant matter as claimed in claim 4, wherein said transmission shaft is coupled to the corresponding second output shaft by means of an elastic coupling.

6. An agricultural machine for harvesting plant matter as claimed in claim 4, wherein the pivoting lateral casing includes an endless transmission the driving wheel of which is coupled to the transmission shaft and the receiving wheel of which is coupled to the second conditioning member.

7. An agricultural machine for harvesting plant matter as claimed in claim 6, wherein the endless transmission of the pivoting lateral casing is a chain drive.

8. An agricultural machine for harvesting plant matter as claimed in claim 4, wherein the longitudinal axis of said transmission shaft is substantially coincident with the longitudinal axis of the corresponding second output shaft.

9. An agricultural machine for harvesting plant matter as claimed in claim 8, wherein the pivoting lateral casing can pivot substantially about the longitudinal axis of the corresponding second output shaft.

10. An agricultural machine for harvesting plant matter as claimed in claim 3, wherein the pivoting lateral casing is a substantially leaktight casing containing a lubricant.

11. An agricultural machine for harvesting plant matter as claimed in claim 1, wherein the second conditioning member of one conditioning unit is connected at its inner end to a pivoting arm capable of pivoting about an axis of pivoting extending close to the longitudinal axis of the corresponding second output shaft and substantially parallel to said longitudinal axis.

12. An agricultural machine for harvesting plant matter as claimed in claim 11, wherein the articulation defining the axis of pivoting of the pivoting arm is an elastic articulation.

13. An agricultural machine for harvesting plant matter as claimed in claim 11, wherein the transmission device of each second conditioning member of one conditioning unit includes a pivoting lateral casing situated at the outer end of said second conditioning member and the pivoting of the latter allowed by the pivoting lateral casing and the pivoting arm takes place against the action of an elastically deformable member the intensity of the return action of which can be altered using an adjustment device.

14. An agricultural machine for harvesting plant matter as claimed in claim 13, wherein the elastically deformable member consists of two coaxial torsion bars extending one in the extension of the other and the common longitudinal axis of which is coincident with the axis of pivoting of the pivoting arm.

15. An agricultural machine for harvesting plant matter as claimed in claim 14, wherein just one adjustment member is provided per conditioning unit and this acts on the adjacent ends of the corresponding two torsion bars.

16. An agricultural machine for harvesting plant matter as claimed in claim 1, wherein the transmission box includes:

a first single output shaft each end of which forms the first output shaft of the corresponding conditioning unit and a second single output shaft each end of which forms the second output shaft of the corresponding conditioning unit.

17. An agricultural machine for harvesting plant matter as claimed in claim 16, wherein the transmission box includes a driveshaft coupled to the first single output shaft by means of a first pair of bevel gears and of an endless transmission, and to the second single output shaft by means of a second pair of bevel gears.

18. An agricultural machine for harvesting plant matter as claimed in claim 17, wherein the first pair of bevel gears and the second pair of bevel gears have their driving bevel gear in common, and this is borne by the driveshaft.

19. An agricultural machine for harvesting plant matter as claimed in claim 17, wherein the driving wheel of the endless transmission of the transmission box is coupled to the receiving bevel gear of the first pair of bevel gears while the receiving wheel of said endless transmission is coupled to first single output shaft.

20. An agricultural machine for harvesting plant matter as claimed in claim 19, wherein the endless transmission of the transmission box is a chain drive.

21. An agricultural machine for harvesting plant matter as claimed in claim 19, wherein the driving wheel of the endless transmission of the transmission box and the receiving bevel gear of the first pair of bevel gears form a set which is coaxial with the second single output shaft but not rotationally connected thereto.

22. An agricultural machine for harvesting plant matter as claimed in claim 17, wherein the transmission box includes a third output shaft intended to drive the cutting mechanism.

23. An agricultural machine for harvesting plant matter as claimed in claim 22, wherein the driveshaft is coupled to the third output shaft by means of a third pair of bevel gears.

24. An agricultural machine for harvesting plant matter as claimed in claim 23, wherein the first pair of bevel gears, the second pair of bevel gears and the third pair of bevel gears have their driving bevel gear in common, and this is borne by the driveshaft.

25. An agricultural machine for harvesting plant matter as claimed in claim 22, wherein a transmission casing is provided and receives movement from the third output shaft and drives, from above, at least one of the cutting members of the cutting mechanism.

26. An agricultural machine for harvesting plant matter as claimed in claim 25, wherein the cutting member(s) driven by the transmission casing is (are) situated substantially in the vertical mid-plane of the machine directed in the direction of travel during work.

27. An agricultural machine for harvesting plant matter as claimed in claim 17, wherein the transmission box additionally includes an input casing with an input shaft coupled to the driveshaft by means of a pair of input bevel gears.

28. An agricultural machine for harvesting plant matter as claimed in claim 27, wherein the longitudinal axis of the driveshaft is directed upward.

29. An agricultural machine for harvesting plant matter as claimed in claim 28, wherein the input casing can occupy several positions by pivoting about the longitudinal axis of the driveshaft.

30. An agricultural machine for harvesting plant matter as claimed in claim 29, wherein the various angular positions that the input casing can occupy correspond to various positions that the draw bar can occupy by pivoting about the axis of pivoting defined by the articulation which connects the draw bar to the frame.

31. An agricultural machine for harvesting plant matter as claimed in claim 28, wherein the longitudinal axis of the driveshaft is substantially parallel to the axis of pivoting defined by the articulation connecting the draw bar to the frame.

32. An agricultural machine for harvesting plant matter as claimed in claim 27, wherein the input shaft of the input casing is coupled to a line of shafts which is at least partially borne by the draw bar.

33. An agricultural machine for harvesting plant matter as claimed in claim 17, wherein the transmission box includes a third output shaft intended to drive the cutting mechanism and the driveshaft is coupled to the third output shaft by means of a third pair of bevel gears, said transmission box including:

a first compartment containing the first pair of bevel gears, the second pair of bevel gears and, as appropriate, the third pair of bevel gears, and a second compartment containing the endless transmission.

34. An agricultural machine for harvesting plant matter as claimed in claim 33, wherein:

the second compartment includes a drip pan for recovering the oil contained in the second compartment and splashed up by the endless transmission, in order to transfer it into the first compartment, and the first compartment has a communication with the second compartment allowing the oil contained in the first compartment to return to the second compartment.

35. An agricultural machine for harvesting plant matter as claimed in claim 27, wherein the transmission box includes a first compartment and a pump pumping the oil contained in said first compartment into the input casing, the latter having a communication allowing oil contained therein to return to the first compartment.

36. An agricultural machine for harvesting plant matter as claimed in claim 5, wherein the transmission box includes a second single output shaft each end of which forms the second output shaft of the corresponding conditioning unit and the elastic coupling coupling the transmission shaft to said second single output shaft includes a flange connected to said second single output shaft, the flange of the coupling of one of these second conditioning members being fixed to the corresponding end of said second single output shaft, while the flange of the coupling of the other second conditioning member is mounted so that it can slide on the corresponding end of said second single output shaft.

37. An agricultural machine for harvesting plant matter as claimed in claim 1, wherein the harvesting mechanism additionally includes a carrying structure and the transmission box is connected to said carrying structure by means of three elastic articulations.

38. An agricultural machine for harvesting plant matter as claimed in claim 1, wherein the harvesting mechanism additionally includes a carrying structure and the outer end of each first conditioning member is supported by said carrying structure by means of an elastic bearing.

39. An agricultural machine for harvesting plant matter as claimed in claim 1, wherein the articulation connecting the draw bar to the frame extends substantially in the vertical mid-plane of the machine, which plane is directed in the direction of travel during work.

40. An agricultural machine for harvesting plant matter as claimed in claim 1, wherein each second conditioning member extends substantially above the corresponding first conditioning member.

* * * * *